(12) United States Patent
Xu et al.

(10) Patent No.: US 9,450,807 B2
(45) Date of Patent: Sep. 20, 2016

(54) INTER-DOMAIN VIRTUAL NETWORK MAPPING METHOD AND SYSTEM AND INTER-DOMAIN VIRTUAL NETWORK

(71) Applicants: Tsinghua University, Beijing (CN); Beijing Institute of Technology, Beijing (CN)

(72) Inventors: Ke Xu, Beijing (CN); Meng Shen, Beijing (CN)

(73) Assignees: Tsinghua University, Beijing (CN); Beijing Institute of Technology, Beijing (CN)

( * ) Notice: Subject to any disclaimer, the term of this patent is extended or adjusted under 35 U.S.C. 154(b) by 63 days.

(21) Appl. No.: 14/448,595

(22) Filed: Jul. 31, 2014

(65) Prior Publication Data
US 2015/0036541 A1   Feb. 5, 2015

(30) Foreign Application Priority Data

Jul. 31, 2013   (CN) .......................... 2013 1 0329749

(51) Int. Cl.
*H04L 12/24* (2006.01)
(52) U.S. Cl.
CPC .......... *H04L 41/0226* (2013.01); *H04L 41/04* (2013.01); *H04L 41/0896* (2013.01); *H04L 41/12* (2013.01)
(58) Field of Classification Search
CPC .................................................. H04L 41/0226
See application file for complete search history.

(56) References Cited

U.S. PATENT DOCUMENTS 8,559,334 B2 * 10/2013 Iovanna ................. H04L 45/02
                                                                 370/254
8,943,499 B2 *  1/2015 Turner ............................ 718/1
(Continued)

OTHER PUBLICATIONS

Chowdhury, Mosharaf; Rahman, Muntasir Raihan; Boutaba, Raouf; ViNEYard: Virtual Network Embedding Algorithms With Coordinated Node and Link Mapping, IEEE/ACM Transactions on Networking, vol. 20, No. 1, Feb. 2012.*

(Continued)

*Primary Examiner* — Melvin Marcelo
*Assistant Examiner* — Peter Solinsky
(74) *Attorney, Agent, or Firm* — David D. Brush; Westman Champlin & Koehler, P.A.

(57) ABSTRACT

An inter-domain virtual network mapping method, an inter-domain virtual network and an inter-domain virtual network mapping system are provided. The method comprises: receiving an inter-domain virtual network request; obtaining a latest physical network architecture information of each of N network domains; calculating an optimized mapping solution according to the latest physical network architecture information of the N network domains to divide an inter-domain virtual network into N virtual sub-networks, each virtual sub-network corresponding to one of the N network domains; sending each virtual sub-network to a corresponding network domain thereof and performing a mapping in each network domain; initializing SUM=0, and updating SUM according to a result of the mapping in each network domain; determining whether SUM is equal to N; if yes, instructing each network domain to distribute a physical network source for the inter-domain virtual network request; and if no, instructing each network domain to undo any procedure.

18 Claims, 4 Drawing Sheets

— candidate set
-------- intra-domain augmented link
— — — extra-domain augmented link

(56) References Cited

U.S. PATENT DOCUMENTS

| | | | |
|---|---|---|---|
| 2002/0126642 A1* | 9/2002 | Shitama | H04L 29/06 370/338 |
| 2008/0080441 A1* | 4/2008 | Park | H04W 64/00 370/338 |
| 2010/0002700 A1* | 1/2010 | Simpson, Jr. | H04L 29/12783 370/392 |
| 2011/0019674 A1* | 1/2011 | Iovanna | H04L 45/02 370/392 |
| 2011/0295942 A1* | 12/2011 | Raghunath | H04L 45/00 709/203 |
| 2011/0296053 A1* | 12/2011 | Medved | H04L 67/104 709/241 |
| 2013/0290955 A1* | 10/2013 | Turner | H04L 41/12 718/1 |
| 2013/0326494 A1* | 12/2013 | Nunez | H04L 41/082 717/172 |
| 2014/0126466 A1* | 5/2014 | Hamdi | H04W 24/02 370/328 |
| 2015/0185749 A1* | 7/2015 | Steinke | G06Q 10/06 307/24 |

OTHER PUBLICATIONS

Meng Shen et al., "Towards Efficient Virtual Network Embedding Across Multiple Network Domains," Quality of Service, 2014 IEEE, May 26-27, 2014, pp. 61-70.

* cited by examiner

INTER-DOMAIN VIRTUAL NETWORK MAPPING METHOD AND SYSTEM AND INTER-DOMAIN VIRTUAL NETWORK

CROSS-REFERENCE TO RELATED APPLICATION

This application claims priority to and benefits of Chinese Patent Application Serial No. 201310329749.6, filed with the State Intellectual Property Office of P. R. China on Jul. 31, 2013, the entire content of which is incorporated herein by reference.

FIELD

The present disclosure relates to a network virtualization field, and more particularly to an inter-domain virtual network mapping method, an inter-domain virtual network and an inter-domain virtual network mapping system.

BACKGROUND

The virtual network refers to a computer network constructed by some network apparatuses (such as an exchanger, a router) by the ISP (Internet Service Provider) with the virtualization technology. The generation of the virtual network provides significant advantages for both the ISP and the user. For one hand, the ISP may provide a plurality of virtual networks, based on the current physical network architecture, to meet diverse demands of various uses, thus improving the utilization ratio of network apparatuses and reducing the network running and maintenance cost. For the other hand, the user may hire virtual networks with different capacities according to specific business demands so as to greatly reduce the cost of purchasing and deploying of apparatus, and in the mean time, the virtual network may be regarded as a private network in logic so as to meet the specific business demand by deploying the private network protocol.

The virtual network consists of the virtual nodes and the virtual links. The process of mapping the virtual nodes and the virtual links to the physical nodes and the physical links respectively is called as virtual network mapping. As everyone known, the Internet is actually an interconnection of different network domains which belong to different ISPs. Each ISP will not let other ISPs know core information of its physical network architecture, which results in the limitation of the virtual network mapping within a single domain. However, the coverage area of a single domain is very limited, while the business of the user may relate to a plurality of different domains. Therefore, the conventional intra-domain virtual network cannot fully meet the business demands of the user, which hinders a large scale application and promotion of the virtual network.

SUMMARY

Embodiments of the present disclosure seek to solve at least one of the problems existing in the related art to at least some extent.

According to a first aspect of the present disclosure, an inter-domain virtual network mapping method is provided. The method comprises steps of: receiving an inter-domain virtual network request; obtaining a latest physical network architecture information of each of N network domains; calculating an optimized mapping solution according to the latest physical network architecture information of the N network domains to divide an inter-domain virtual network into N virtual sub-networks, each virtual sub-network corresponding to one of the N network domains; sending each virtual sub-network to a corresponding network domain thereof and performing a mapping in each network domain; initializing SUM=0, and updating SUM according to a result of the mapping in each network domain; determining whether SUM is equal to N; if yes, instructing each network domain to distribute a physical network source for the inter-domain virtual network request; and if no, instructing each network domain to undo any procedure.

In one embodiment, the inter-domain virtual network request comprises: information about a virtual node comprising: a desired capacity for defining a serving capability of the virtual node and represented by any one of the number of CPUs, a memory capacity, a storage capacity of a network router and a combination thereof, a desired position represented by a longitude and latitude coordinate, and a mapping radius for defining a maximum distance between an actual mapping position and the desired position of the virtual node; and information about a virtual link comprising a pair of vertices and a desired bandwidth.

In one embodiment, the physical network architecture information comprises: an available capacity of a physical node for defining a remaining serving capability of the physical node and represented by any one of the number of available CPUs, a memory capacity, a storage capacity of the physical node and a combination thereof; a position of the physical node represented by the longitude and latitude coordinate; a price of a unit capacity of the physical node; an available bandwidth of an inter-domain physical link which links two adjacent network domains; a pair of vertices of the inter-domain physical link; a price of a unit bandwidth of the inter-domain physical link; a price of a unit length and a unit bandwidth of an intra-domain physical link which links the physical nodes in one domain.

In one embodiment, calculating an optimized mapping solution according to the latest physical network architecture information of the N network domains to divide an inter-domain virtual network into N virtual sub-networks comprises: establishing an augmented network according to the inter-domain virtual network request and the latest physical network architecture information of the N network domains, wherein in the augmented network, each virtual node of the inter-domain virtual network is corresponding to a group of candidate physical nodes, and each virtual link is corresponding to a physical link linking to two virtual nodes; calculating an optimized mapping solution having a lowest mapping price by the augmented network to divide the inter-domain virtual network into the N virtual sub-networks.

In one embodiment, establishing an augmented network comprises: providing the group of candidate physical nodes for each virtual node, wherein each candidate physical node meets conditions including the available capacity of the candidate physical node being larger than or equal to the desired capacity of the virtual node, and a distance between a position of the candidate physical node and the desired position of the virtual node being less than or equal to the mapping radius; providing an extra-domain augmented link for linking each virtual node with each candidate physical node thereof based on physical network architectures of the N network domains; and providing an intra-domain augmented link for paired linking physical nodes in each physical network architecture.

In one embodiment, calculating an optimized mapping solution according to the latest physical network architecture information of the N network domains comprises: determining a target function aiming at minimizing a sum of a mapping price of all virtual nodes of the inter-domain virtual network and a mapping price of all virtual links of the inter-domain virtual network; setting a constraint condition including each virtual node only mapping to one candidate physical node, different virtual nodes mapping to different candidate physical nodes, each virtual link only mapping to one physical link, and a sum of bandwidths of virtual links carried by each physical link not exceeding an available bandwidth of each physical link; and solving the target function according to the constraint condition.

In one embodiment, updating SUM according to a result of the mapping in each network domain comprises: determining whether the mapping in each network domain is successful; if yes, making SUM=SUM+1; if no, making SUM unchanged.

The inter-domain virtual network mapping method according to embodiments of the present disclosure has advantages of maximal compatibility with a current Internet commercial model, high efficiency and effective protection of commercially confidential information of the ISP, which is beneficial to a large scale application and promotion of the inter-domain virtual network.

According to a second aspect of the present disclosure, an inter-domain virtual network is provided. The inter-domain virtual network is for performing: receiving an inter-domain virtual network request; obtaining a latest physical network architecture information of each of N network domains; calculating an optimized mapping solution according to the latest physical network architecture information of the N network domains to divide an inter-domain virtual network into N virtual sub-networks, each virtual sub-network corresponding to one of the N network domains; sending each virtual sub-network to a corresponding network domain thereof and performing a mapping in each network domain; initializing SUM=0, and updating SUM according to a result of the mapping in each network domain; determining whether SUM is equal to N; if yes, instructing each network domain to distribute a physical network source for the inter-domain virtual network request; and if no, instructing each network domain to undo any procedure.

In one embodiment, the inter-domain virtual network request comprises: information about a virtual node comprising: a desired capacity for defining a serving capability of the virtual node and represented by any one of the number of CPUs, a memory capacity, a storage capacity of a network router and a combination thereof, a desired position represented by a longitude and latitude coordinate, and a mapping radius for defining a maximum distance between an actual mapping position and the desired position of the virtual node; and information about a virtual link comprising a pair of vertices and a desired bandwidth.

In one embodiment, the physical network architecture information comprises: an available capacity of a physical node for defining a remaining serving capability of the physical node and represented by any one of the number of available CPUs, a memory capacity, a storage capacity of the physical node and a combination thereof; a position of the physical node represented by the longitude and latitude coordinate; a price of a unit capacity of the physical node; an available bandwidth of an inter-domain physical link which links two adjacent network domains; a pair of vertices of the inter-domain physical link; a price of a unit bandwidth of the inter-domain physical link; a price of a unit length and a unit bandwidth of an intra-domain physical link which links the physical nodes in one domain.

In one embodiment, calculating an optimized mapping solution according to the latest physical network architecture information of the N network domains to divide an inter-domain virtual network into N virtual sub-networks comprises: establishing an augmented network according to the inter-domain virtual network request and the latest physical network architecture information of the N network domains, wherein in the augmented network, each virtual node of the inter-domain virtual network is corresponding to a group of candidate physical nodes, and each virtual link is corresponding to a physical link linking to two virtual nodes; calculating an optimized mapping solution having a lowest mapping price by the augmented network to divide the inter-domain virtual network into the N virtual sub-networks.

In one embodiment, establishing an augmented network comprises: providing the group of candidate physical nodes for each virtual node, wherein each candidate physical node meets conditions including the available capacity of the candidate physical node being larger than or equal to the desired capacity of the virtual node, and a distance between a position of the candidate physical node and the desired position of the virtual node being less than or equal to the mapping radius; providing an extra-domain augmented link for linking each virtual node with each candidate physical node thereof based on physical network architectures of the N network domains; and providing an intra-domain augmented link for paired linking physical nodes in each physical network architecture.

In one embodiment, calculating an optimized mapping solution according to the latest physical network architecture information of the N network domains comprises: determining a target function aiming at minimizing a sum of a mapping price of all virtual nodes of the inter-domain virtual network and a mapping price of all virtual links of the inter-domain virtual network; setting a constraint condition including each virtual node only mapping to one candidate physical node, different virtual nodes mapping to different candidate physical nodes, each virtual link only mapping to one physical link, and a sum of bandwidths of virtual links carried by each physical link not exceeding an available bandwidth of each physical link; and solving the target function according to the constraint function.

In one embodiment, updating SUM according to a result of the mapping in each network domain comprises: determining whether the mapping in each network domain is successful; if yes, making SUM=SUM+1; if no, making SUM unchanged.

The inter-domain virtual network according to embodiments of the present disclosure, which may realize an inter-domain virtual network mapping, has advantages of maximal compatibility with a current Internet commercial model, high efficiency and effective protection of commercially confidential information of the ISP, which is beneficial to a large scale application and promotion of the inter-domain virtual network.

According to a third aspect of the present disclosure, an inter-domain virtual network mapping system is provided. The system is for performing: receiving an inter-domain virtual network request; obtaining a latest physical network architecture information of each of N network domains; calculating an optimized mapping solution according to the latest physical network architecture information of the N network domains to divide an inter-domain virtual network into N virtual sub-networks, each virtual sub-network corresponding to one of the N network domains; sending each virtual sub-network to a corresponding network domain thereof and performing a mapping in each network domain; initializing SUM=0, and updating SUM according to a result of the mapping in each network domain; determining whether SUM is equal to N; if yes, instructing each network domain to distribute a physical network source for the inter-domain virtual network request; and if no, instructing each network domain to undo any procedure.

In one embodiment, the inter-domain virtual network request comprises: information about a virtual node comprising: a desired capacity for defining a serving capability of the virtual node and represented by any one of the number of CPUs, a memory capacity, a storage capacity of a network router and a combination thereof, a desired position represented by a longitude and latitude coordinate, and a mapping radius for defining a maximum distance between an actual mapping position and the desired position of the virtual node; and information about a virtual link comprising a pair of vertices and a desired bandwidth.

In one embodiment, the physical network architecture information comprises: an available capacity of a physical node for defining a remaining serving capability of the physical node and represented by any one of the number of available CPUs, a memory capacity, a storage capacity of the physical node and a combination thereof; a position of the physical node represented by the longitude and latitude coordinate; a price of a unit capacity of the physical node; an available bandwidth of an inter-domain physical link which links two adjacent network domains; a pair of vertices of the inter-domain physical link; a price of a unit bandwidth of the inter-domain physical link; a price of a unit length and a unit bandwidth of an intra-domain physical link which links the physical nodes in one domain.

In one embodiment, calculating an optimized mapping solution according to the latest physical network architecture information of the N network domains to divide an inter-domain virtual network into N virtual sub-networks comprises: establishing an augmented network according to the inter-domain virtual network request and the latest physical network architecture information of the N network domains, wherein in the augmented network, each virtual node of the inter-domain virtual network is corresponding to a group of candidate physical nodes, and each virtual link is corresponding to a physical link linking to two virtual nodes; calculating an optimized mapping solution having a lowest mapping price by the augmented network to divide the inter-domain virtual network into the N virtual sub-networks.

In one embodiment, establishing an augmented network comprises: providing the group of candidate physical nodes for each virtual node, wherein each candidate physical node meets conditions including the available capacity of the candidate physical node being larger than or equal to the desired capacity of the virtual node, and a distance between a position of the candidate physical node and the desired position of the virtual node being less than or equal to the mapping radius; providing an extra-domain augmented link for linking each virtual node with each candidate physical node thereof based on physical network architectures of the N network domains; and providing an intra-domain augmented link for paired linking physical nodes in each physical network architecture.

In one embodiment, calculating an optimized mapping solution according to the latest physical network architecture information of the N network domains comprises: determining a target function aiming at minimizing a sum of a mapping price of all virtual nodes of the inter-domain virtual network and a mapping price of all virtual links of the inter-domain virtual network; setting a constraint condition including each virtual node only mapping to one candidate physical node, different virtual nodes mapping to different candidate physical nodes, each virtual link only mapping to one physical link, and a sum of bandwidths of virtual links carried by each physical link not exceeding an available bandwidth of each physical link; and solving the target function according to the constraint condition.

The inter-domain virtual network mapping system according to embodiments of the present disclosure has advantages of maximal compatibility with a current Internet commercial model, high efficiency and effective protection of commercially confidential information of the ISP, which is beneficial to a large scale application and promotion of the inter-domain virtual network.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
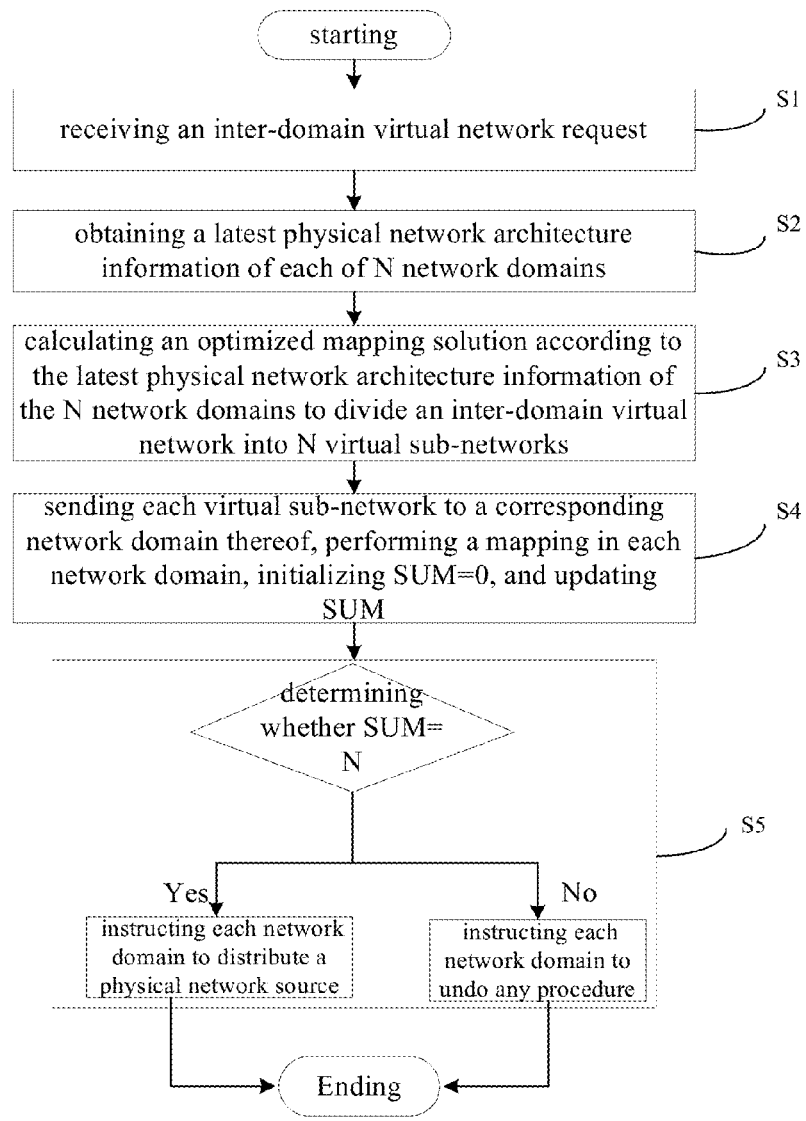
FIG. 1 is flow chart of an inter-domain virtual network mapping method according to embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

According to embodiments of the present disclosure, an inter-domain virtual network mapping method is provided. As shown in FIG. 1, the method includes following steps.

At step S1, an inter-domain virtual network request is received. Specifically, the inter-domain virtual network request is presented by a virtual network user according to a business demand thereof and is sent to a VNP.

Figure 2:
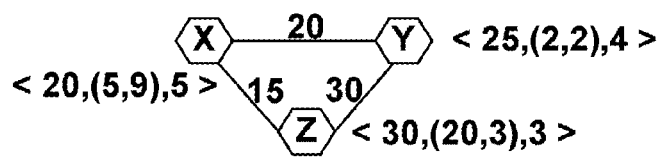
FIG. 2 is a schematic view of a virtual node and a virtual link.

In one embodiment, as shown in FIG. 2, the inter-domain virtual network request may comprise information about a virtual node and information about a virtual link. The information about the virtual node includes a desired capacity, a desired position and a mapping radius. The desired capacity of the virtual node is for defining a serving capability of the virtual node and is represented by any one of the number of CPUs, a memory capacity, a storage capacity of a network router and a combination thereof, the desired position is represented by a longitude and latitude coordinate, and the mapping radius is for defining a maximum distance between an actual mapping position and the desired position of the virtual node. The virtual link is defined by a binary group consisting of a pair of vertices and a desired bandwidth. The pair of vertices includes a source vertex and a target vertex.

At step S2, latest physical network architecture information of each of N network domains is obtained. Specifically, after receiving the inter-domain virtual network request from the virtual network user, the VNP asks each network domain for the latest physical network architecture information thereof.

Figure 3:
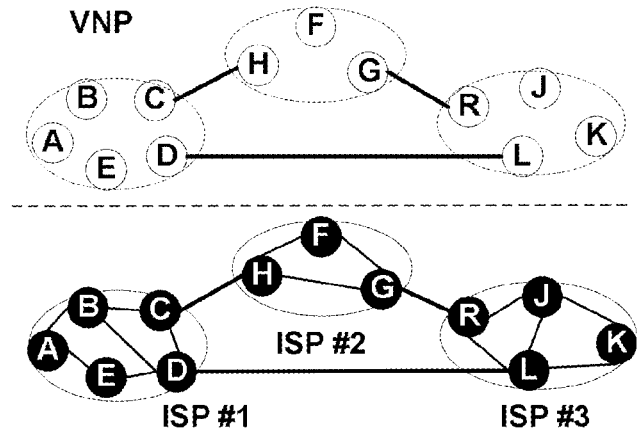
FIG. 3 is a schematic view of a physical network obtained by VNP (virtual network provider)

In one embodiment, the physical network architecture information may include following three categories of information as shown in FIG. 3.

(1) An available capacity, a position and a price of a unit capacity of the physical node. The available capacity of the physical node is for defining a remaining serving capability of the physical node and is represented by any one of the number of available CPUs, a memory capacity, a storage capacity of the physical node and a combination thereof, the position of the physical node is represented by the longitude and latitude coordinate.

(2) An available bandwidth, a pair of vertices and a price of a unit bandwidth of an inter-domain physical link. The inter-domain physical link refers to a link linking two physical nodes in two adjacent network domains. The pair of vertices refers to the two physical nodes connected by the inter-domain physical link.

(3) A price of a unit length and a unit bandwidth of an intra-domain physical link. The intra-domain physical link refers to a link linking physical nodes in one domain.

At step S3, an optimized mapping solution is calculated according to the latest physical network architecture information of the N network domains to divide an inter-domain virtual network into N virtual sub-networks, in which each virtual sub-network is corresponding to one of the N network domains.

In one embodiment, step S3 may include following steps.

At step S3-1, an augmented network is established according to the inter-domain virtual network request and the latest physical network architecture information of the N network domains. In the augmented network, each virtual node of the inter-domain virtual network is corresponding to a group of candidate physical nodes, and each virtual link is corresponding to a physical link linking to the two virtual nodes.

Figure 4:
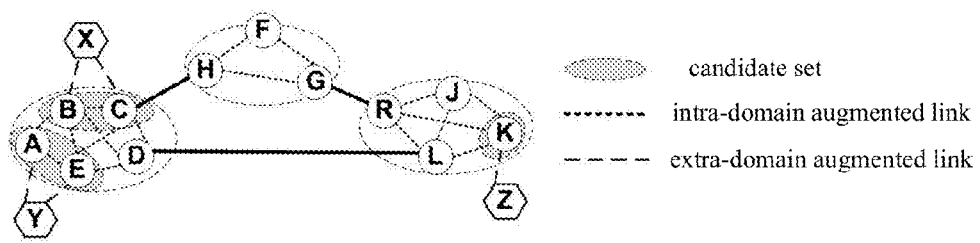
FIG. 4 is a schematic view of an augmented network.

Further, as shown in FIG. 4, the augmented network is established by following steps.

At step S3-1-1, the group of candidate physical nodes is provided for each virtual node. Each candidate physical node meets conditions that the available capacity of the candidate physical node is larger than or equal to the desired capacity of the virtual node, and a distance between a position of the candidate physical node and the desired position of the virtual node is less than or equal to the mapping radius. The physical nodes meeting the above conditions are called as the candidate physical nodes of the virtual node, and a set consisting of all of the candidate physical nodes is called as a candidate set of the virtual node.

At step S3-1-2, an extra-domain augmented link is provided for linking each virtual node with each of the candidate physical nodes thereof based on physical network architectures of the N network domains.

At step S3-1-3, an intra-domain augmented link is provided for paired linking physical nodes in each physical network architecture.

At step S3-2, an optimized mapping solution having a lowest mapping price is calculated by the augmented network to divide the inter-domain virtual network into the N virtual sub-networks.

Further, the calculation of the optimized mapping solution is abstracted as an optimization problem, which includes following steps.

At step S3-2-1, a target function is determined. The target function aims at minimizing a sum of a mapping price of all virtual nodes of the inter-domain virtual network and a mapping price of all virtual links of the inter-domain virtual network.

At step S3-2-2, a constraint condition is set. The constraint condition includes that each virtual node can and only can map to one candidate physical node, different virtual nodes can and only cannot map to the same candidate physical node, each virtual link can and only can map to one physical link, and a sum of bandwidths of virtual links carried by each physical link cannot exceed an available bandwidth of each physical link.

At step S3-2-3, the target function is solved according to the constraint condition.

At step S4, each virtual sub-network is sent to a corresponding network domain thereof, a mapping is performed in each network domain, it is initialized that SUM=0, and SUM is updated according to a result of the mapping in each network domain. Specifically, each virtual sub-network is sent to a corresponding network domain thereof by the VNP, the mapping is performed in each network domain by each ISP, the initialization and updating of SUM is performed by the VNP.

In one embodiment, updating SUM according to a result of the mapping in each network domain comprises: determining whether the mapping in each network domain is successful; if yes, making SUM=SUM+1; if no, making SUM unchanged.

Figure 5:
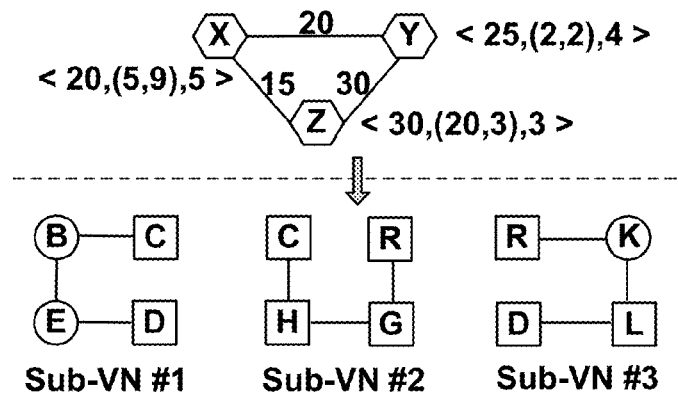
FIG. 5 is a schematic view of a virtual sub-network.

At step S5, as shown in FIG. 5, it is determined whether SUM is equal to N; if yes, each network domain is instructed to distribute a physical network source for the inter-domain virtual network request; and if no, each network domain is instructed to undo any procedure. In one embodiment, if it is determined that SUM is equal to N, the VNP feeds back success information to the virtual network user and each ISP, and each ISP distributes a physical network source for the inter-domain virtual network request; and if it is determined that SUM is less than N, the VNP feeds back failure information to the virtual network user and each ISP, and each ISP undoes any procedure.

Figure 6:
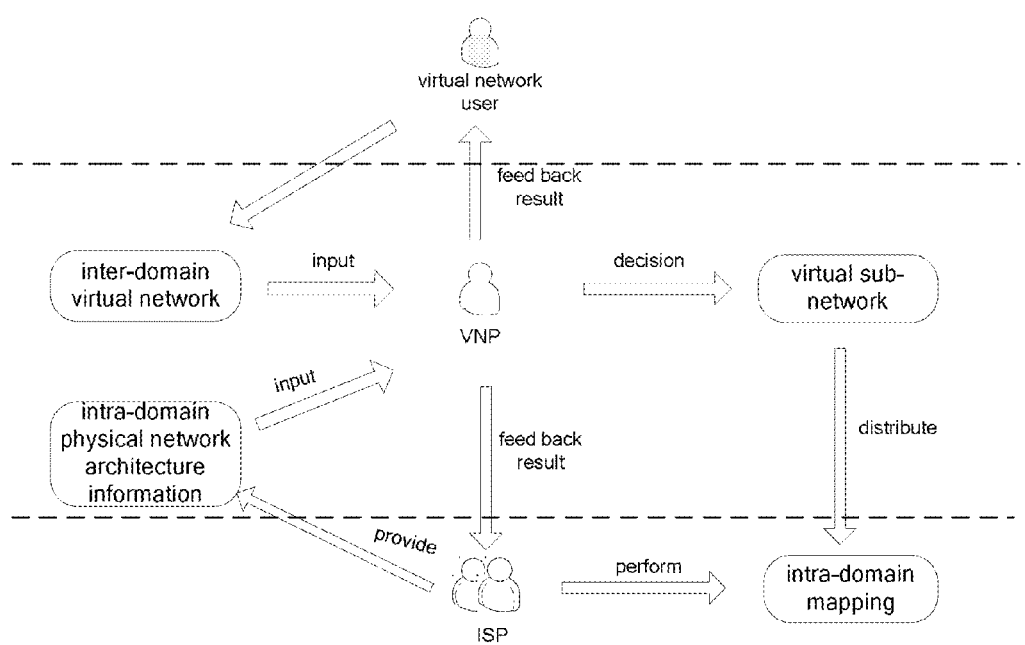
FIG. 6 is a schematic view of an application of the inter-domain virtual network mapping method according to embodiments of the present disclosure.

Furthermore, the inter-domain virtual network mapping method according to embodiments of the present disclosure will be summarized as follows with reference to FIG. 6. The virtual network user defines a desired inter-domain virtual network and sends the inter-domain virtual network request to the VNP. Each ISP provides the latest physical network architecture information of the network domain thereof to the VNP. The VNP calculates the optimized solution according to all of the latest physical network architecture information to divide an inter-domain virtual network into N virtual sub-networks. Each virtual sub-network is corresponding to one of the N network domains. Each ISP performs an intra-domain mapping on the corresponding virtual sub-network. The VNP determines an ultimate mapping result according to all of intra-domain mapping results of the virtual sub-networks and feeds back the ultimate mapping result to the virtual network user and each ISP.

Furthermore, to fully illustrate an effect of the method according to embodiments of the present disclosure, a performance simulation of the method and another three comparative methods is made. Another three methods are briefly introduced as follows.

(1) Reference Method

Provided the VNP has all (rather than only the latest) physical network architecture information of each network domain. Since this hypothesis is not available in reality, it is just used as a reference to evaluate other methods.

(2) Price Priority Method

The VNP maps the virtual node to a candidate physical node with a lowest price by using the latest physical network architecture information of each network domain.

(3) Speed Priority Method

The VNP maps the virtual node to a first candidate physical node by using the latest physical network architecture information of each network domain so as to optimize a mapping speed.

Figure 7:
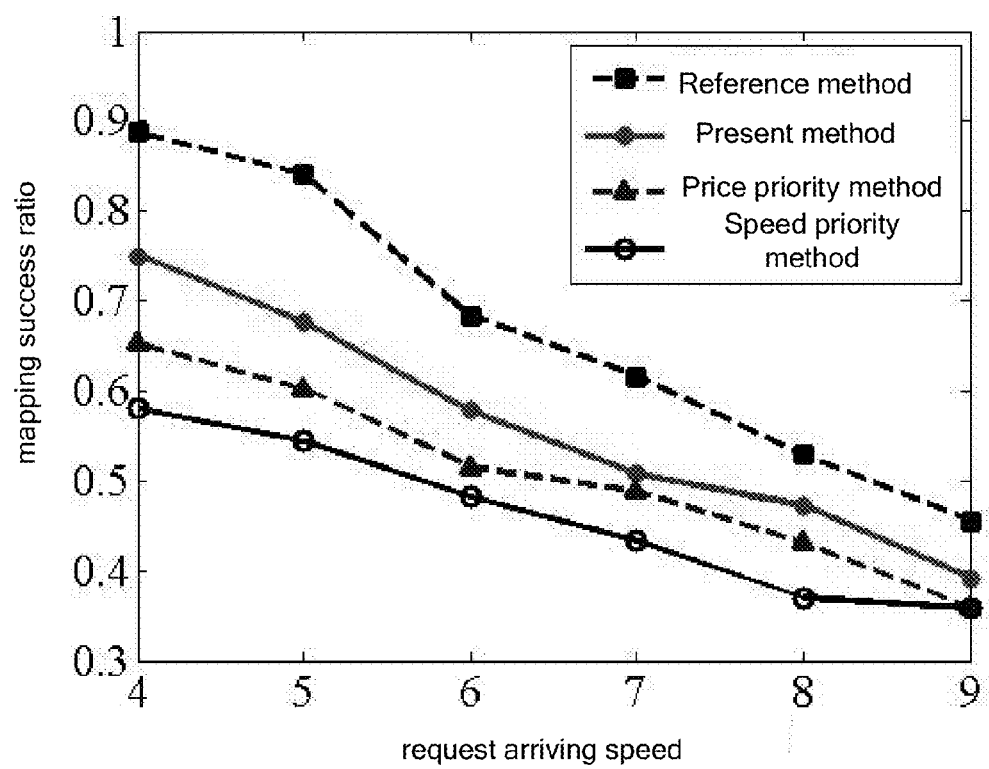
FIG. 7 is a curve graph showing mapping success ratios of different inter-domain virtual network mapping methods.

FIG. 7 shows simulation results of mapping success ratios of different mapping methods with different request arriving speeds. As shown in FIG. 7, all the mapping success ratios of the method according to embodiments of the present disclosure with different request arriving speeds approach to 80-90% of ideal values in the reference method. It also can be seen that the method according to embodiments of the present disclosure is advantageous than the other two comparative methods.

The inter-domain virtual network mapping method according to embodiments of the present disclosure has advantages of maximal compatibility with a current Internet commercial model, high efficiency and effective protection of commercially confidential information of the ISP, which is beneficial to a large scale application and promotion of the inter-domain virtual network.

According to embodiments of the present disclosure, an inter-domain virtual network is provided. As shown in FIG. 1, the inter-domain virtual network performs following steps.

At step S1, an inter-domain virtual network request is received. Specifically, the inter-domain virtual network request is presented by a virtual network user according to a business demand thereof and is sent to a VNP.

In one embodiment, as shown in FIG. 2, the inter-domain virtual network request may comprise information about a virtual node and information about a virtual link. The information about the virtual node includes a desired capacity, a desired position and a mapping radius. The desired capacity of the virtual node is for defining a serving capability of the virtual node and is represented by any one of the number of CPUs, a memory capacity, a storage capacity of a network router and a combination thereof, the desired position is represented by a longitude and latitude coordinate, and the mapping radius is for defining a maximum distance between an actual mapping position and the desired position of the virtual node. The virtual link is defined by a binary group consisting of a pair of vertices and a desired bandwidth. The pair of vertices includes a source vertex and a target vertex.

At step S2, latest physical network architecture information of each of N network domains is obtained. Specifically, after receiving the inter-domain virtual network request from the virtual network user, the VNP asks each network domain for the latest physical network architecture information thereof.

In one embodiment, the physical network architecture information may include following three categories of information as shown in FIG. 3.

(1) An available capacity, a position and a price of a unit capacity of the physical node. The available capacity of the physical node is for defining a remaining serving capability of the physical node and is represented by any one of the number of available CPUs, a memory capacity, a storage capacity of the physical node and a combination thereof, the position of the physical node is represented by the longitude and latitude coordinate.

(2) An available bandwidth, a pair of vertices and a price of a unit bandwidth of an inter-domain physical link. The inter-domain physical link refers to a link linking two physical nodes in two adjacent network domains. The pair of vertices refers to the two physical nodes connected by the inter-domain physical link.

(3) A price of a unit length and a unit bandwidth of an intra-domain physical link. The intra-domain physical link refers to a link linking physical nodes in one domain.

At step S3, an optimized mapping solution is calculated according to the latest physical network architecture information of the N network domains to divide an inter-domain virtual network into N virtual sub-networks, in which each virtual sub-network is corresponding to one of the N network domains.

In one embodiment, step S3 may include following steps.

At step S3-1, an augmented network is established according to the inter-domain virtual network request and the latest physical network architecture information of the N network domains. In the augmented network, each virtual node of the inter-domain virtual network is corresponding to a group of candidate physical nodes, and each virtual link is corresponding to a physical link linking to the two virtual nodes.

Further, as shown in FIG. 4, the augmented network is established by following steps.

At step S3-1-1, the group of candidate physical nodes is provided for each virtual node. Each candidate physical node meets conditions that the available capacity of the candidate physical node is larger than or equal to the desired capacity of the virtual node, and a distance between a position of the candidate physical node and the desired position of the virtual node is less than or equal to the mapping radius. The physical nodes meeting the above conditions are called as the candidate physical nodes of the virtual node, and a set consisting of all of the candidate physical nodes is called as a candidate set of the virtual node.

At step S3-1-2, an extra-domain augmented link is provided for linking each virtual node with each of the candidate physical nodes thereof based on physical network architectures of the N network domains.

At step S3-1-3, an intra-domain augmented link is provided for paired linking physical nodes in each physical network architecture.

At step S3-2, an optimized mapping solution having a lowest mapping price is calculated by the augmented network to divide the inter-domain virtual network into the N virtual sub-networks.

Further, the calculation of the optimized mapping solution is abstracted as an optimization problem, which includes following steps.

At step S3-2-1, a target function is determined. The target function aims at minimizing a sum of a mapping price of all virtual nodes of the inter-domain virtual network and a mapping price of all virtual links of the inter-domain virtual network.

At step S3-2-2, a constraint condition is set. The constraint condition includes that each virtual node can and only can map to one candidate physical node, different virtual nodes can and only cannot map to the same candidate physical node, each virtual link can and only can map to one physical link, and a sum of bandwidths of virtual links carried by each physical link cannot exceed an available bandwidth of each physical link.

At step S3-2-3, the target function is solved according to the constraint condition.

At step S4, each virtual sub-network is sent to a corresponding network domain thereof, a mapping is performed in each network domain, it is initialized that SUM=0, and SUM is updated according to a result of the mapping in each network domain. Specifically, each virtual sub-network is sent to a corresponding network domain thereof by the VNP, the mapping is performed in each network domain by each ISP, the initialization and updating of SUM is performed by the VNP.

In one embodiment, updating SUM according to a result of the mapping in each network domain comprises: determining whether the mapping in each network domain is successful; if yes, making SUM=SUM+1; if no, making SUM unchanged.

At step S5, as shown in FIG. 5, it is determined whether SUM is equal to N; if yes, each network domain is instructed to distribute a physical network source for the inter-domain virtual network request; and if no, each network domain is instructed to undo any procedure. In one embodiment, if it is determined that SUM is equal to N, the VNP feeds back success information to the virtual network user and each ISP, and each ISP distributes a physical network source for the inter-domain virtual network request; and if it is determined that SUM is less than N, the VNP feeds back failure information to the virtual network user and each ISP, and each ISP undoes any procedure.

The inter-domain virtual network according to embodiments of the present disclosure, which may realize an inter-domain virtual network mapping, has advantages of maximal compatibility with a current Internet commercial model, high efficiency and effective protection of commercially confidential information of the ISP, which is beneficial to a large scale application and promotion of the inter-domain virtual network.

According to embodiments of the present disclosure, an inter-domain virtual network mapping system is provided. As shown in FIG. 1, the system performs following steps.

At step S1, an inter-domain virtual network request is received. Specifically, the inter-domain virtual network request is presented by a virtual network user according to a business demand thereof and is sent to a VNP.

In one embodiment, as shown in FIG. 2, the inter-domain virtual network request may comprise information about a virtual node and information about a virtual link. The information about the virtual node includes a desired capacity, a desired position and a mapping radius. The desired capacity of the virtual node is for defining a serving capability of the virtual node and is represented by any one of the number of CPUs, a memory capacity, a storage capacity of a network router and a combination thereof, the desired position is represented by a longitude and latitude coordinate, and the mapping radius is for defining a maximum distance between an actual mapping position and the desired position of the virtual node. The virtual link is defined by a binary group consisting of a pair of vertices and a desired bandwidth. The pair of vertices includes a source vertex and a target vertex.

At step S2, latest physical network architecture information of each of N network domains is obtained. Specifically, after receiving the inter-domain virtual network request from the virtual network user, the VNP asks each network domain for the latest physical network architecture information thereof.

In one embodiment, the physical network architecture information may include following three categories of information as shown in FIG. 3.

(1) An available capacity, a position and a price of a unit capacity of the physical node. The available capacity of the physical node is for defining a remaining serving capability of the physical node and is represented by any one of the number of available CPUs, a memory capacity, a storage capacity of the physical node and a combination thereof, the position of the physical node is represented by the longitude and latitude coordinate.

(2) An available bandwidth, a pair of vertices and a price of a unit bandwidth of an inter-domain physical link. The inter-domain physical link refers to a link linking two physical nodes in two adjacent network domains. The pair of vertices refers to the two physical nodes connected by the inter-domain physical link.

(3) A price of a unit length and a unit bandwidth of an intra-domain physical link. The intra-domain physical link refers to a link linking physical nodes in one domain.

At step S3, an optimized mapping solution is calculated according to the latest physical network architecture information of the N network domains to divide an inter-domain virtual network into N virtual sub-networks, in which each virtual sub-network is corresponding to one of the N network domains.

In one embodiment, step S3 may include following steps.

At step S3-1, an augmented network is established according to the inter-domain virtual network request and the latest physical network architecture information of the N network domains. In the augmented network, each virtual node of the inter-domain virtual network is corresponding to a group of candidate physical nodes, and each virtual link is corresponding to a physical link linking to the two virtual nodes.

Further, as shown in FIG. 4, the augmented network is established by following steps.

At step S3-1-1, the group of candidate physical nodes is provided for each virtual node. Each candidate physical node meets conditions that the available capacity of the candidate physical node is larger than or equal to the desired capacity of the virtual node, and a distance between a position of the candidate physical node and the desired position of the virtual node is less than or equal to the mapping radius. The physical nodes meeting the above conditions are called as the candidate physical nodes of the virtual node, and a set consisting of all of the candidate physical nodes is called as a candidate set of the virtual node.

At step S3-1-2, an extra-domain augmented link is provided for linking each virtual node with each of the candidate physical nodes thereof based on physical network architectures of the N network domains.

At step S3-1-3, an intra-domain augmented link is provided for paired linking physical nodes in each physical network architecture.

At step S3-2, an optimized mapping solution having a lowest mapping price is calculated by the augmented network to divide the inter-domain virtual network into the N virtual sub-networks.

Further, the calculation of the optimized mapping solution is abstracted as an optimization problem, which includes following steps.

At step S3-2-1, a target function is determined. The target function aims at minimizing a sum of a mapping price of all virtual nodes of the inter-domain virtual network and a mapping price of all virtual links of the inter-domain virtual network.

At step S3-2-2, a constraint condition is set. The constraint condition includes that each virtual node can and only can map to one candidate physical node, different virtual nodes can and only cannot map to the same candidate physical node, each virtual link can and only can map to one physical link, and a sum of bandwidths of virtual links carried by each physical link cannot exceed an available bandwidth of each physical link.

At step S3-2-3, the target function is solved according to the constraint condition.

At step S4, each virtual sub-network is sent to a corresponding network domain thereof, a mapping is performed in each network domain, it is initialized that SUM=0, and SUM is updated according to a result of the mapping in each network domain. Specifically, each virtual sub-network is sent to a corresponding network domain thereof by the VNP, the mapping is performed in each network domain by each ISP, the initialization and updating of SUM is performed by the VNP.

In one embodiment, updating SUM according to a result of the mapping in each network domain comprises: determining whether the mapping in each network domain is successful; if yes, making SUM=SUM+1; if no, making SUM unchanged.

At step S5, as shown in FIG. 5, it is determined whether SUM is equal to N; if yes, each network domain is instructed to distribute a physical network source for the inter-domain virtual network request; and if no, each network domain is instructed to undo any procedure. In one embodiment, if it is determined that SUM is equal to N, the VNP feeds back success information to the virtual network user and each ISP, and each ISP distributes a physical network source for the inter-domain virtual network request; and if it is determined that SUM is less than N, the VNP feeds back failure information to the virtual network user and each ISP, and each ISP undoes any procedure.

The inter-domain virtual network mapping system according to embodiments of the present disclosure has advantages of maximal compatibility with a current Internet commercial model, high efficiency and effective protection of commercially confidential information of the ISP, which is beneficial to a large scale application and promotion of the inter-domain virtual network.

One or more elements of the inter-domain virtual network mapping system and any acts of the methods disclosed herein may be implemented, for example, on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a non-transitory computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor. For example one or more parts of the system may be implemented by a computer processor with associated memory and timing circuitry (not separately shown) that is a functional part of the system and is activated by, and facilitates functionality of other components or parts of the system.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An inter-domain virtual network mapping method, performed by a server of a virtual network provider and comprising:

receiving an inter-domain virtual network request;
obtaining a latest physical network architecture information of each of N network domains;
calculating an optimized mapping solution according to the latest physical network architecture information of the N network domains to divide an inter-domain virtual network into N virtual sub-networks, each virtual sub-network corresponding to one of the N network domains, the optimized mapping solution making a sum of a mapping price of all virtual nodes of the inter-domain virtual network and a mapping price of all virtual links of the inter-domain virtual network minimum;
sending each virtual sub-network to a corresponding network domain thereof and performing a mapping in each network domain;
initializing SUM=0, traversing each network domain and receiving a result of the mapping in each network domain, and updating SUM according to the result of the mapping in each network domain,
wherein updating SUM according to the result of the mapping in each network domain comprises:
determining whether the mapping in each network domain is successful;
if yes, making SUM=SUM+1;
if no, making SUM unchanged;
determining whether SUM is equal to N;
if yes, instructing each network domain to distribute a physical network source for the inter-domain virtual network request; and
if no, instructing each network domain to maintain current status.

2. The method according to claim 1, wherein the inter-domain virtual network request comprises:
information about a virtual node comprising:
a desired capacity for defining a serving capability of the virtual node and represented by any one of the number of CPUs, a memory capacity, a storage capacity of a network router and a combination thereof,
a desired position represented by a longitude and latitude coordinate, and
a mapping radius for defining a maximum distance between an actual mapping position and the desired position of the virtual node; and
information about a virtual link comprising a pair of vertices and a desired bandwidth.

3. The method according to claim 2, wherein the physical network architecture information comprises:
an available capacity of a physical node for defining a remaining serving capability of the physical node and represented by any one of the number of available CPUs, a memory capacity, a storage capacity of the physical node and a combination thereof;
a position of the physical node represented by the longitude and latitude coordinate;
a price of a unit capacity of the physical node;
an available bandwidth of an inter-domain physical link which links two adjacent network domains;
a pair of vertices of the inter-domain physical link;
a price of a unit bandwidth of the inter-domain physical link;
a price of a unit length and a unit bandwidth of an intra-domain physical link which links the physical nodes in one domain.

4. The method according to claim 2, wherein calculating an optimized mapping solution according to the latest physical network architecture information of the N network domains to divide an inter-domain virtual network into N virtual sub-networks comprises:
establishing an augmented network according to the inter-domain virtual network request and the latest physical network architecture information of the N network domains, wherein in the augmented network, each virtual node of the inter-domain virtual network is corresponding to a group of candidate physical nodes, and each virtual link is corresponding to a physical link linking to two virtual nodes;
calculating an optimized mapping solution having a lowest mapping price by the augmented network to divide the inter-domain virtual network into the N virtual sub-networks.

5. The method according to claim 3, wherein establishing an augmented network comprises:
providing the group of candidate physical nodes for each virtual node, wherein each candidate physical node meets conditions including the available capacity of the candidate physical node being larger than or equal to the desired capacity of the virtual node, and a distance between a position of the candidate physical node and the desired position of the virtual node being less than or equal to the mapping radius;
providing an extra-domain augmented link for linking each virtual node with each candidate physical node thereof based on physical network architectures of the N network domains; and
providing an intra-domain augmented link for paired linking physical nodes in each physical network architecture.

6. The method according to claim 5, wherein calculating an optimized mapping solution according to the latest physical network architecture information of the N network domains comprises:
determining a target function aiming at minimizing the sum of the mapping price of all virtual nodes of the inter-domain virtual network and the mapping price of all virtual links of the inter-domain virtual network;
setting a constraint condition including each virtual node only mapping to one candidate physical node, different virtual nodes mapping to different candidate physical nodes, each virtual link only mapping to one physical link, and a sum of bandwidths of virtual links carried by each physical link not exceeding an available bandwidth of each physical link; and
solving the target function according to the constraint condition.

7. An inter-domain virtual network device configured to be disposed in a server of a virtual network provider and comprising:
a non-transitory memory comprising instructions stored thereon:
a processor, configured by the instructions to perform acts of:
receiving an inter-domain virtual network request;
obtaining a latest physical network architecture information of each of N network domains;
calculating an optimized mapping solution according to the latest physical network architecture information of the N network domains to divide an inter-domain virtual network into N virtual sub-networks, each virtual sub-network corresponding to one of the N network domains, the optimized mapping solution making a sum of a mapping price of all virtual nodes of the inter-domain virtual network and a mapping price of all virtual links of the inter-domain virtual network minimum;

sending each virtual sub-network to a corresponding network domain thereof and performing a mapping in each network domain;

initializing SUM=0, traversing each network domain and receiving a result of the mapping in each network domain, and updating SUM according to the result of the mapping in each network domain, wherein updating SUM according to the result of the mapping in each network domain comprises:

determining whether the mapping in each network domain is successful;

if yes, making SUM=SUM+1;

if no, making SUM unchanged;

determining whether SUM is equal to N;

if yes, instructing each network domain to distribute a physical network source for the inter-domain virtual network request; and if no, instructing each network domain to maintain current status.

8. The inter-domain virtual network device according to claim 7, wherein the inter-domain virtual network request comprises:

information about a virtual node comprising:

a desired capacity for defining a serving capability of the virtual node and represented by any one of the number of CPUs, a memory capacity, a storage capacity of a network router and a combination thereof, a desired position represented by a longitude and latitude coordinate, and a mapping radius for defining a maximum distance between an actual mapping position and the desired position of the virtual node; and information about a virtual link comprising a pair of vertices and a desired bandwidth.

9. The inter-domain virtual network device according to claim 8, wherein the physical network architecture information comprises:

an available capacity of a physical node for defining a remaining serving capability of the physical node and represented by any one of the number of available CPUs, a memory capacity, a storage capacity of the physical node and a combination thereof;

a position of the physical node represented by the longitude and latitude coordinate;

a price of a unit capacity of the physical node;

an available bandwidth of an inter-domain physical link which links two adjacent network domains;

a pair of vertices of the inter-domain physical link;

a price of a unit bandwidth of the inter-domain physical link;

a price of a unit length and a unit bandwidth of an intra-domain physical link which links the physical nodes in one domain.

10. The inter-domain virtual network device according to claim 8, wherein calculating an optimized mapping solution according to the latest physical network architecture information of the N network domains to divide an inter-domain virtual network into N virtual sub-networks comprises:

establishing an augmented network according to the inter-domain virtual network request and the latest physical network architecture information of the N network domains, wherein in the augmented network, each virtual node of the inter-domain virtual network is corresponding to a group of candidate physical nodes, and each virtual link is corresponding to a physical link linking to two virtual nodes;

calculating an optimized mapping solution having a lowest mapping price by the augmented network to divide the inter-domain virtual network into the N virtual sub-networks.

11. The inter-domain virtual network device according to claim 9, wherein establishing an augmented network comprises:

providing the group of candidate physical nodes for each virtual node, wherein each candidate physical node meets conditions including the available capacity of the candidate physical node being larger than or equal to the desired capacity of the virtual node, and a distance between a position of the candidate physical node and the desired position of the virtual node being less than or equal to the mapping radius;

providing an extra-domain augmented link for linking each virtual node with each candidate physical node thereof based on physical network architectures of the N network domains; and providing an intra-domain augmented link for paired linking physical nodes in each physical network architecture.

12. The inter-domain virtual network device according to claim 11, wherein calculating an optimized mapping solution according to the latest physical network architecture information of the N network domains comprises:

determining a target function aiming at minimizing the sum of the mapping price of all virtual nodes of the inter-domain virtual network and the mapping price of all virtual links of the inter-domain virtual network;

setting a constraint condition including each virtual node only mapping to one candidate physical node, different virtual nodes mapping to different candidate physical nodes, each virtual link only mapping to one physical link, and a sum of bandwidths of virtual links carried by each physical link not exceeding an available bandwidth of each physical link; and solving the target function according to the constraint condition.

13. An inter-domain virtual network mapping system configured to be disposed in a server of a virtual network provider and comprising:

a non-transitory memory comprising instructions stored thereon;

a processor, configured by the instructions to perform acts of:

receiving an inter-domain virtual network request;

obtaining a latest physical network architecture information of each of N network domains;

calculating an optimized mapping solution according to the latest physical network architecture information of the N network domains to divide an inter-domain virtual network into N virtual sub-networks, each virtual sub-network corresponding to one of the N network domains, the optimized mapping solution making a sum of a mapping price of all virtual nodes of the inter-domain virtual network and a mapping price of all virtual links of the inter-domain virtual network minimum;

sending each virtual sub-network to a corresponding network domain thereof and performing a mapping in each network domain;

initializing SUM=0, and traversing each network domain and receiving a result of the mapping in each network domain, and updating SUM according to the result of the mapping in each network domain,
wherein updating SUM according to the result of the mapping in each network domain comprises:
determining whether the mapping in each network domain is successful;
if yes, making SUM=SUM+1;
if no, making SUM unchanged;
determining whether SUM is equal to N;
if yes, instructing each network domain to distribute a physical network source for the inter-domain virtual network request; and
if no, instructing each network domain to maintain current status.

14. The system according to claim 13, wherein the inter-domain virtual network request comprises:
information about a virtual node comprising:
a desired capacity for defining a serving capability of the virtual node and represented by any one of the number of CPUs, a memory capacity, a storage capacity of a network router and a combination thereof,
a desired position represented by a longitude and latitude coordinate, and
a mapping radius for defining a maximum distance between an actual mapping position and the desired position of the virtual node; and
information about a virtual link comprising a pair of vertices and a desired bandwidth.

15. The system according to claim 14, wherein the physical network architecture information comprises:
an available capacity of a physical node for defining a remaining serving capability of the physical node and represented by any one of the number of available CPUs, a memory capacity, a storage capacity of the physical node and a combination thereof;
a position of the physical node represented by the longitude and latitude coordinate;
a price of a unit capacity of the physical node;
an available bandwidth of an inter-domain physical link which links two adjacent network domains;
a pair of vertices of the inter-domain physical link;
a price of a unit bandwidth of the inter-domain physical link;
a price of a unit length and a unit bandwidth of an intra-domain physical link which links the physical nodes in one domain.

16. The system according to claim 14, wherein calculating an optimized mapping solution according to the latest physical network architecture information of the N network domains to divide an inter-domain virtual network into N virtual sub-networks comprises:
establishing an augmented network according to the inter-domain virtual network request and the latest physical network architecture information of the N network domains, wherein in the augmented network, each virtual node of the inter-domain virtual network is corresponding to a group of candidate physical nodes, and each virtual link is corresponding to a physical link linking to two virtual nodes;
calculating an optimized mapping solution having a lowest mapping price by the augmented network to divide the inter-domain virtual network into the N virtual sub-networks.

17. The system according to claim 15, wherein establishing an augmented network comprises:
providing the group of candidate physical nodes for each virtual node, wherein each candidate physical node meets conditions including the available capacity of the candidate physical node being larger than or equal to the desired capacity of the virtual node, and a distance between a position of the candidate physical node and the desired position of the virtual node being less than or equal to the mapping radius;
providing an extra-domain augmented link for linking each virtual node with each candidate physical node thereof based on physical network architectures of the N network domains; and
providing an intra-domain augmented link for paired linking physical nodes in each physical network architecture.

18. The system according to claim 17, wherein calculating an optimized mapping solution according to the latest physical network architecture information of the N network domains comprises:
determining a target function aiming at minimizing a sum of a mapping price of all virtual nodes of the inter-domain virtual network and a mapping price of all virtual links of the inter-domain virtual network;
setting a constraint condition including each virtual node only mapping to one candidate physical node, different virtual nodes mapping to different candidate physical nodes, each virtual link only mapping to one physical link, and a sum of bandwidths of virtual links carried by each physical link not exceeding an available bandwidth of each physical link; and
solving the target function according to the constraint condition.

* * * * *